United States Patent [19]

Kobayashi

[11] 4,263,626
[45] Apr. 21, 1981

[54] CONTROL SYSTEM FOR A TAPE RECORDER

[75] Inventor: Kozo Kobayashi, Kodaira, Japan

[73] Assignee: Nakamichi Corporation, Tokyo, Japan

[21] Appl. No.: 77,108

[22] Filed: Sep. 19, 1979

[30] Foreign Application Priority Data

Sep. 22, 1978 [JP] Japan .......................... 53-130408[U]
Dec. 13, 1978 [JP] Japan .......................... 53-172258[U]

[51] Int. Cl.³ ...................... G11B 15/04; G11B 15/12
[52] U.S. Cl. ...................................... 360/60; 360/61; 360/75
[58] Field of Search ................... 360/75, 105, 60, 61, 360/62

[56] References Cited

U.S. PATENT DOCUMENTS

| | | | |
|---|---|---|---|
| 3,810,237 | 5/1974 | Nozawa | 360/105 |
| 3,947,884 | 3/1976 | Yokoto et al. | 360/105 |
| 4,071,861 | 1/1978 | Hirose | 360/105 |
| 4,129,889 | 12/1978 | Ban et al. | 360/105 |
| 4,159,492 | 6/1979 | Ban et al. | 360/105 |

Primary Examiner—Vincent P. Canney
Attorney, Agent, or Firm—Pearne, Gordon, Sessions, McCoy & Granger

[57] ABSTRACT

This invention relates to a control system for a tape recorder wherein magnetic head means is selectively moved relative to a magnetic tape. A recording and reproducing circuit including a recording amplifier and a reproducing amplifier is connected to the magnetic head means. Control means driven by a control electric motor moves the magnetic head means from a stopping mode to an operating mode including at least recording mode and reproducing mode. Mode selecting switches are provided to operate the control electric motor. The control system of the invention comprises means provided in the recording and reproducing circuit to energize it when instruction signals are received. The control system also comprises comparator means at its output connected to the means energizing the recording and reproducing circuit and at its input connected to muting reference signal generating means and to variable signal generating means to generate a variable signal varying in accordance with movement of the magnetic head means relative to the magnetic tape. The comparator means is constructed to generate the instruction signals during the period after the magnetic head means contacts the magnetic tape and before the magnetic head means reaches the position where the recording and reproducing mode is to be effected.

7 Claims, 1 Drawing Figure

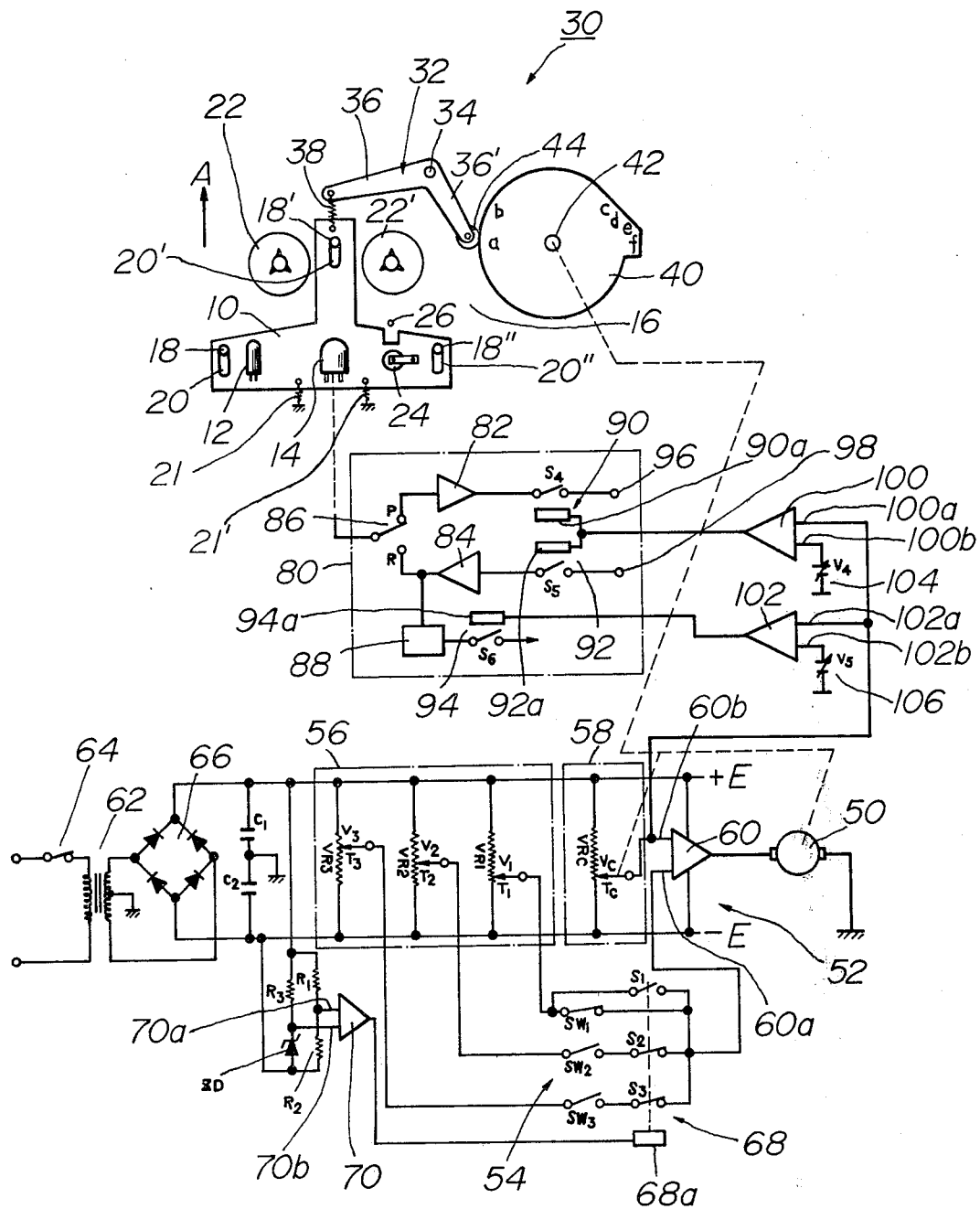

CONTROL SYSTEM FOR A TAPE RECORDER

BACKGROUND OF THE INVENTION

When a tape recorder is changed from one of stopping and recording modes to the other mode, a recording head tends to be undesirably magnetized by a biasing current. In the prior art, biasing switching means have been provided to control the biasing current when the tape recorder is switched from one of the stopping and recording modes to the other mode so as to prevent the undesirable magnetization of the head. Also, muting switching means have been provided to cut off an unnatural recording or reproducing signal which tends to occur due to transient operation of magnetic head means engaging with a magnetic tape during switching from one of the stopping and recording or reproducing modes to the other mode. The biasing and muting switching means have been associated with a displacement member such as a head base plate which is forwardly or backwardly displaced in accordance with the selected modes. Otherwise, the biasing and muting switching means have been electrically operated by a logical circuit. However, a timing at which the switching means are operated has been affected by the positions of the switching means relative to the displacement member. This prevents the operation of the tape recorder from being accurately and easily effected. Furthermore, the operation cannot be positively effected due to inaccurate position of the displacement member. The logical circuit causes the tape recorder to be more expensive.

There has been provided an arrangement such that when a power switch is turned off in the condition of modes other than stopping mode, for example during the operation of reproducing or playing mode, the stopping mode is automatically selected in order to avoid the continuation of engagement of a pinch roller with a capstan, which is unnecessary for the stopping mode. In the prior art, such an arrangement is adapted to disengage an operating lever from its locking via a plunger of an electromagnetic member. However, this arrangement cannot be advantageously applied to a cassette type tape recorder constructed to change the modes by means of a control electric motor.

SUMMARY OF THE INVENTION

Accordingly, it is a principal object of the invention to provide a control system for a tape recorder wherein a muting operation of the tape recorder can be more accurately, easily and inexpensively effected.

It is another object of the invention to provide a control system for a tape recorder wherein a stopping mode can be automatically returned when a power switch is cut off during the operation of modes other than the stopping mode.

In accordance with the invention, there is provided a control system for a tape recorder comprising a recording and reproducing circuit connected to magnetic head means, control means to move said magnetic head means from a stopping mode to an operating mode including at least a recording mode and reproducing mode, a control electric motor to drive said control means, and mode selecting switches to select said stopping and operating modes to operate said control electric motor until said selected mode is reached, characterized by further comprising;

means provided in said recording and reproducing circuit to energize said recording and reproducing circuit when instruction signals are received;
muting reference signal generating means to generate muting reference signals;
variable signal generating means to generate a variable signal varying in accordance with movement of said magnetic head means relative to a magnetic tape;
and comparator means at its output connected to said means to energize said recording and reproducing circuit and at its input connected to muting reference signal generating means and to variable signal generating means to comparatively operate said muting reference signals and said variable signal to thereby generate said instruction signals during the period after said magnetic head means contacts said magnetic tape and before said magnetic head means reaches the position where said recording and reproducing mode is to be effected.

BRIEF DESCRIPTION OF THE DRAWING

The above and other objects and features of the invention will be apparent from the description of the embodiment taken with reference to the accompanying drawing in which;

a single FIGURE schematically illustrates a control system for a cassette tape recorder constructed in accordance with the invention.

DETAILED DESCRIPTION OF THE EMBODIMENT

In a single FIGURE, a reverse T-shaped head base plate 10 which has an erasing magnetic head 12 and a recording and reproducing magnetic head 14 mounted thereon is movably disposed on a chassis 16. The head base plate 10 may be guided by guide pins 18, 18' and 18" secured to the chassis 16 and extending through slots 20, 20' and 20" in the head base plate 10. Thus, the head base plate 10 may be movable in a direction indicated by an arrow A in the figure. A pair of reel wheels 22 and 22' are provided on a chassis 16. The reel wheels 22 and 22' may be disposed in a symmetrical manner on both sides of the leg portion of the head base plate 10. A cassette tape (not shown) is mounted on and passes between the reel wheels 22 and 22'. A pinch roller 24 is also mounted on the head base plate 10 and associates with a capstan 26 protruding through the chassis 16 when the head base plate 10 moves in a direction indicated by the arrow A, so that the tape is held between the pinch roller 24 and the capstan 26 to be fed from one of the reel wheels 22 and 22' to the other reel wheel.

There is provided control means 30 to control the head base plate 10 together with the recording and reproducing magnetic head 14 thereon. This control means 30 may include a curved control lever 32 pivotally mounted on the chassis 16 by a pivot pin 34. The control lever 32 has one arm 36 connected by a spring 38 to the leg portion of the head base plate 10. Thus, if the control lever 32 is angularly moved in a clockwise direction, then the magnetic heads 12 and 14 and the pinch roller 24 are moved in a forward direction, but if the control lever 32 is angularly moved in a counterclockwise direction, the heads 12 and 14 and the pinch roller 24 are moved in a backward direction by means of springs 21 and 21' which are provided between the head base plate 10 and the chassis 16 so as to urge the head base plate 10 in a direction reverse to the arrow A.

The control means 30 may further comprise a cam 40 rotatably mounted on the chassis 16 by a shaft 42. Another arm 36' of the control lever 32 may have an engaging roller 44 engaging with the cam 40. The indications a, b, c, d, e and f on the cam 40 show the positions at which the engaging roller 44 engages with the cam 40 in the respective modes of the tape recorder. The indications a, b and f correspond to the positions of the stopping mode, the fast forwarding mode and the recording or reproducing mode, while the indications d and e correspond to the positions of closing a biasing relay contact and muting relay contact which will be described later. The indication c corresponds to the position in which the recording and reproducing head 14 just engages the magnetic tape. The positions of the cam 40 indicated by a and b are located at an equal distance from the axis of the shaft 42 while the positions of the cam 40 indicated by c to f are gradually far from the axis of the shaft 42. The position indicated by f is diametrically farthest from the axis of the shaft 42.

There is provided a control electric motor 50 which rotates the cam 40 through a not shown reduction gear. Drive means 52 which drives the control electric motor 50 comprises a mode selecting switch group 54, a stopping and operating reference signal generating circuit 56, a variable signal generating circuit 58 and an operational circuit 60.

The mode selecting switch group 54 comprises three switches $SW_1$, $SW_2$ and $SW_3$ which serve to select the stopping, fast forwarding and playing modes, respectively.

The stopping and operating reference signal generating circuit 56 comprises three rotary variable resistors $VR_1$, $VR_2$ and $VR_3$ which are provided in parallel between DC source lines $+E$ and $-E$ to generate reference voltage $V_1$ to $V_3$ corresponding to the respective modes at the respective variable terminals $T_1$ to $T_3$. The switches $SW_1$, $SW_2$ and $SW_3$ at their one end are connected to the respective variable terminals $T_1$ to $T_3$ of the reference signal generating circuit 56. The switch $SW_1$ at its other end is connected directly to one of inputs 60a of the operational circuit 60 and the switches $SW_2$ and $SW_3$ at their other end are connected through normally closed relay contacts $S_2$ and $S_3$ of a stopping control relay 68 to the input 60a of the operational circuit 60. Another relay contact $S_1$ which is normally open is provided in parallel to the switch $SW_1$. A power transformer 62 has a primary side connected through a power switch 64 to a not shown AC power source, and has a secondary side connected to AC terminals of a full wave rectifier 66. DC terminals of the full wave rectifier 66 are connected to the DC source lines $+E$ and $-E$. Capacitors $C_1$ and $C_2$ which are connected in series to each other and the connection point of which are grounded to earth are provided between the DC source lines $+E$ and $-E$. The capacitors $C_1$ and $C_2$ serve to smooth the DC output from the full wave rectifier 66.

A comparator circuit 70 is provided to have one input 70a connected to the connection point of electric resistors $R_1$ and $R_2$ which are connected in series to each other between the DC source lines $+E$ and $-E$ so as to form a voltage divider. Another input 70b of the comparative circuit 70 is connected to the connection point of an electric resistor $R_3$ and a Zener diode ZD which are also connected in series between the DC source lines $+E$ and $-E$ so as to form a constant voltage generator. Thus, the comparator circuit 70 at its input 70a receives a divided voltage corresponding to the level of the voltage across the DC source lines $+E$ and $-E$ and at its input 70b receives a reference or constant voltage $V_s$ corresponding to the Zener voltage of the Zener diode ZD. The reference voltage $V_s$ is set at the level as 70 to 80 percentage as the voltage received at the input 70a of the comparator 70. The comparator 70 generates an output signal for energizing the relay coil 68a when the voltage at the input 70a is less than the reference voltage $V_s$ at the input 70b.

The variable signal generating circuit 58 comprises a rotary variable resistor $VR_c$ which is provided in parallel to the reference signal generating circuit 56 between the DC source lines $+E$ and $-E$ and has a variable terminal $T_c$ slidable with angular movement of the cam 40 by means of the control electric motor 50 to generate a variable voltage $V_c$ corresponding to the angular position of the cam 40 at the variable terminal $T_c$. The variable terminal $T_c$ of the variable signal generating circuit 58 is connected to the other input 60b of the operational circuit 60.

The operational circuit 60 serves to receive and comparatively operate the reference voltage selected from $V_1$ to $V_3$ and the variable voltage $V_c$ at its inputs 60a and 60b. Thus, if the reference and variable voltages are equal to each other, then the operational circuit 60 generate no output or a control output of 0 to maintain the control electric motor 50 in the stopping mode, if the reference voltage selected from $V_1$ to $V_3$ is higher than the variable voltage $V_c$, then the operational circuit 60 generates one control output to rotate the control electric motor 50 in a forward direction, and if the reference voltage selected from $V_1$ to $V_3$ is lower than the variable voltage $V_c$, then the operational circuit 60 generates another control output to rotate the control electric motor 50 in a reverse direction. If the control electric motor 50 is rotated in a forward direction, the cam 40 is angularly moved in a counterclockwise direction in the figure, and the variable terminal $T_c$ of the variable signal generating circuit 58 is slidably moved toward the source line $+E$ to make the variable voltage higher. Reversely, if the control electric motor 50 is rotated in the reverse direction, the cam 40 is angularly moved in a clockwise direction in the figure, and the variable terminal $T_c$ of the variable signal generating circuit 58 is slidably moved toward the source line $-E$ to make the variable voltage $V_c$ lower.

A recording and reproducing circuit 80 comprises a reproducing amplifier 82 and a recording amplifier 84. The recording and reproducing head 14 is connected through a change-over switch 86 to either of the input of the reproducing amplifier 82 and the output of the recording amplifier 84. The output of the reproducing amplifier 82 is connected through a normally open contact $S_4$ of a first muting relay 90 to an output terminal 96 while the input of the recording amplifier 84 is connected through a normally open contact $S_5$ of a second muting relay 92 to an input terminal 98. A biasing circuit 88 is provided to have one end connected to the output of the recording amplifier 84 and the other end connected through a normally open contact $S_6$ of a biasing relay 94 to a not shown biasing source. There are provided two comparators 100 and 102 which have respective first inputs 100a and 102a connected to the variable terminal $T_c$ of the variable signal generating circuit 58 to receive the variable voltage $V_c$ from the variable signal generating circuit 58. Second inputs 100b and 102b of the comparators 100 and 102 are connected to variable DC potential means 104 and 106 to receive muting reference voltages $V_4$ and $V_5$, respectively. The output of the comparator 100 is connected to the relay coils 90a and 92a of the muting relays 90 and 92 while the output of the comparator 102 is connected to the relay coil 94a of the biasing relay 94. The comparators 100 and 102 serve to comparatively operate the variable voltage $V_c$ and the muting reference voltages $V_4$ and $V_5$ at their levels. If the level of the variable voltage $V_c$ is higher than those of the reference voltages $V_4$ and $V_5$, then the comparators 100 and 102 generate output signals having a predetermined polarity and level to energize the relays 90, 92 and 94 to close the respective contacts $S_4$, $S_5$ and $S_6$ thereof. If the level of the variable voltage $V_c$ is lower than those of the reference voltages $V_4$ and $V_5$, then the comparators 100 and 102 have an output signal of 0 level to de-energize the relays 90, 92 and 94 to open the respective contacts $S_4$, $S_5$ and $S_6$ thereof.

It should be noted that the reference voltages $V_1$ to $V_3$ of the stopping and operating reference signal generating circuits 56 and the muting reference voltages $V_4$ and $V_5$ of the variable DC potential means 104 and 16 are so determined as to have the relation of $V_1 < V_2 < V_5 < V_4 < V_3$. Furthermore, when the roller 44 reaches the positions of the cam 40 at the indications a, b, d, e and f by rotation of the control electric motor 50, the variable voltage $V_c$ at the variable terminal $T_c$ of the variable signal generating circuit 58 becomes the level of the reference voltages $V_1$, $V_2$, $V_5$, $V_4$ and $V_3$ corresponding to the positions of the cam 40 at the respective indications by slidable of the variable terminal $T_c$ of the variable resistor $VR_c$ which is effected by rotation of the control electric motor 50.

In operation, as the change-over switch is switched to the playing side P and as the power switch 64 is closed, the capacitors $C_1$ and $C_2$ are changed to generate a given DC voltage across the DC source lines $+E$ and $-E$ from the power source of rated voltage. Suppose that the stopping switch $SW_1$ is closed to select the stopping mode in which the control electric motor 50 stops. When an operator closes the reproducing switch $SW_3$ to select the reproducing mode, the reproducing reference voltage $V_3$ at the input 60a of the operational circuit 60 is higher than the variable voltage $V_c$ at the input 60b of the operational circuit 60, and therefore, the operational circuit 60 generates the first control output to rotate the control electric motor 50 in a forward direction. Thus, the cam 40 is angularly moved in a counterclockwise direction in the figure, while the variable terminal $T_c$ of the variable signal generating circuit 58 is slidably moved toward the line $+E$ so as to make the variable voltage $V_c$ higher. In the course of slidable movement of the variable terminal $T_c$ and angular movement of the cam 40, after the roller 44 engages the cam 40 at the position just in front of the position indicated by c is given, the curved control lever 32 is angularly moved in a clockwise direction. Thus, the head base plate 16 is moved from the back position which corresponds to the stopping position of the tape recorder to the advanced position which corresponds to the playing position of the tape recorder. When the roller 44 engages the cam 40 at the position indicated by c, the recording and reproducing head 2 begins to engage the magnetic tape. The advancing movement of the head base plate 16 continues until the roller 44 engages the cam at the position indicated by f.

It should be noted that when the roller 44 engages the cam 40 at the position indicated by c, the variable voltage $V_c$ at the variable terminal $T_c$ is still lower than the muting reference voltage $V_4$ at the input 100b of the comparative circuit 100. Therefore, the muting relay contact $S_4$ is still open. Further movement of the variable terminal $T_c$ of the variable signal generating circuit 58 causes the variable voltage $V_c$ to be higher than the muting reference voltage $V_4$ at the input 100b of the comparator 100. At the time, the comparator 100 generates the output or an instruction signal which energizes the muting relays 90 and 92 to close the contacts $S_4$ and $S_5$. Movement of the cam 40 and the variable terminal $T_c$ is stopped when the roller 44 reaches the position of the cam 40 at the indication f, which occurs when the variable voltage $V_c$ is equal to the playing reference voltage $V_3$ at the variable terminal $T_3$ of the variable resistor $VR_3$, which causes the control electric motor 50 to be stopped. Thus, it will be noted that since the muting contact $S_4$ is closed after the recording and reproducing head 14 contacts with the magnetic tape, a sound signal which tends to occur transiently when the head 14 contacts with the magnetic tape is never output from the reproducing amplifier 82. It will be understood that when the roller reaches the position of the cam 40 at the indication f, the pinch roller 24 engages the capstan 26 so as to feed the magnetic tape.

In order to change the tape recorder from the playing mode to the stopping mode, the stopping switch $SW_1$ is closed and the components of the system are operated in a reverse manner. In this case, after the muting contact $S_4$ is opened, the recording and reproducing head 14 is disengaged from the magnetic tape, which prevents a sound signal occuring transiently when the head is disengaged from the magnetic tape, from being output from the amplifier 82.

In case the tape recorder is changed from the stopping mode to the recording mode, the change-over switch 86 is switched to the recording side R and the playing switch $SW_3$ is closed. The control electric motor 50 is driven so as to angularly move the cam 40 in a counterclockwise direction and so as to slidably move the variable terminal $T_c$ of the variable signal generating circuit 58 toward the line $+E$ to make the variable voltage higher in the same manner as aforementioned. This causes the recording and reproducing head 14 to contact with the magnetic tape, after which the comparator 102 generates the output or an instruction signal on engagement of the roller 44 with the cam 40 at the position indicated by d, to energize the biasing relay 94 to thereby close the contact $S_6$ thereof so as to energize the biasing circuit 88. Thereafter, on engagement of the roller 44 with the cam 40 at the position indicated at e, the comparator 100 generates the output or an instruction signal which energizes the muting relays 90 and 92 to close the contacts $S_4$ and $S_5$ thereof. When the roller 44 reaches the position of the cam 40 at the indication f, the comparator 60 generates no output whereby the control electric motor 50 is stopped to maintain the tape recorder at the recording mode. Thus, after the recording and reproducing head 14 contacts with the magnetic tape, the contacts $S_6$ and $S_5$ of the biasing and muting relays 94 and 92 are closed, and as a result, such a trouble as unnecessary magnetization of the magnetic tape on its engagement with the recording and reproducing head 14 can be avoided.

In case the tape recorder is changed from the recording mode to the stopping mode, the sequential operation is in reverse effected, which can also avoid trouble which occurs when the recording and reproducing head 14 is disengaged from the magnetic tape.

In case the tape recorder is changed from the stopping mode to the fast forwarding mode, the fast forwarding switch $SW_2$ is closed. The cam 40 is angularly moved in a counterclockwise direction in the figure, and the variable terminal $T_c$ of the variable signal generating circuit 58 is slidably moved to make the variable voltage higher. When the rooler 44 reaches the position of the cam 40 at the indication b, the control electric motor 50 is stopped. Since the level of the variable voltage $V_c$ never exceeds those of the reference voltages $V_4$ and $V_5$, the contacts $S_4$ to $S_6$ of the muting and biasing relays 90, 92 and 94 are never closed and the control lever 32 is never displaced from the position of the stopping mode so that the head base plate 10 is maintained at the back position. Closure of the fast forwarding switch $SW_2$ causes a not shown drive circuit to be energized so as to drive the reel wheels 22 and 22' at higher speed.

If the tape recorder is at the playing mode, when the power switch 64 is opened without closure of the stopping switch $SW_1$ the charge voltage across the capacitors $C_1$ and $C_2$ is discharged through the operational circuit 60 to drop the level of the potential across the DC source lines $+E$ and $-E$. In this manner, when the level of the voltage at the input 70a of the comparative circuit 70 is lower than that of the reference voltage $V_s$ at the input 70b of the comparative circuit 70, it energizes the coil $68_a$ of the stopping control relay 68. This causes the relay contact $S_3$ to be opened, and the relay contact $S_1$ to be closed. Thus, the reference voltage $V_1$ instead of the reference voltage $V_3$ is applied to the input $60_a$ of the operational circuit 60. Since the capacitors $C_1$ and $C_2$ have a sufficient capacitance, the control electric motor 50 is rotated so as to change the tape recorder from the playing mode to the stopping mode. Thus, the head base plate 10 is moved from the advanced position to the back position so as to disengage the pinch roller 24 from the capstan 26. The potentials at the DC source lines $+E$ and $-E$ vary in accordance with discharge of the capacitors $C_1$ and $C_2$ to vary the reference and variable voltages, but the ratio of the variable degree of both the voltages is constant so as to maintain the same ratio of the reference voltages and the variable voltage. Thus, it will be understood that variation in the reference and variable voltages has no effect on the operation of the tape recorder. It will be also noted that the tape recorder can be automatically returned to the stopping mode when the power switch 64 is opened in the modes other than the playing mode, or when the voltage of the power source is lowered to the level lower than that of the rated voltage.

Although, in the above embodiment, the rewinding and momentary stopping modes are omitted, they can be provided by preparing the reference signal generating circuit components having corresponding reference voltages and the configuration of the cam 40 made in accordance with the modes. An arrangement may be provided wherein when the playing mode is selected, the contacts $S_5$ and $S_6$ of the muting and biasing relays 92 and 94 are not closed, and when the recording mode is selected, the contact $S_4$ of the muting relay 90 is not closed. This may be accomplished by providing switching means operated in association with the playing switch $SW_3$ and the change-over switch 86. It will be understood that the relays 68, 90, 92 and 94 may be composed of semiconductor switching means such as transistors.

Although, in the above embodiment, the variable voltages applied to the comparators 100 and 102 are supplied by the rotary variable resistor $VR_c$ mechanically connected to the control electric motor 50, they may be given by a linear variable resistor associated with the head base plate 10. It should be noted that the variable voltages may be replaced by variable signals which may be produced by disposing luminous elements and photoelectric elements so as to position the head base plate 14 having slits through which lights from the luminous elements pass. The comparators 100 and 102 may be constructed to generate the output signals when the level of the input variable voltages becomes lower than those of the reference voltages. This may be accomplished by selecting the associated components accordingly. In the above embodiment, the reference signal and variable signal generating circuits 56 and 58 are adapted to generate the voltages as signals, but it should be understood that they may be adapted to generate frequency signals.

It will be noted that although, in the embodiment, a single magnetic head is used for recording and reproducing, two magnetic heads may be separately used for them.

While one preferred embodiment of the invention has been illustrated and described with reference to the accompanying drawing, it should be understood that it is by way of example, and that various changes and modifications may be made without departing from the spirit and scope of the invention, which is intended by be defined only to the appended claims.

What is claimed is;

1. A control system for a tape recorder comprising a recording and reproducing circuit connected to magnetic head means, control means to move said magnetic head means from a stopping mode to an operating mode including at least a recording mode and a reproducing mode, a control electric motor to drive said control means, and mode selecting switches to select either of said stopping and operating modes to operate said control electric motor until said selected mode is reached, characterized by further comprising;
    means provided in said recording and reproducing circuit to energize said recording and reproducing circuit when instruction signals are received;
    muting reference signal generating means to generate muting reference signals;
    variable signal generating means to generate a variable signal varying accordance with movement of said magnetic head means relative to a magnetic tape;
    and comparator means at its output connected to said means to energize said recording and reproducing circuit and at its input connected to said muting reference signal generating means and to said variable signal generating means to comparatively operate said muting reference signals and said variable signal to thereby generate said instruction signals during the period after said magnetic head means contacts said magnetic tape and before said magnetic head means reaches the position where said recording and reproducing mode is to be effected.

2. A control system for a tape recorder as set forth in claim 1, wherein said muting reference signal generating means comprises variable DC potential means.

3. A control system for a tape recorder as set forth in claim 1, wherein said means to energize said recording and reproducing circuit comprises switching means connected in series to a recording amplifier and to a reproducing amplifier.

4. A control system for a tape recorder as set forth in claim 3, wherein said means to energize said recording and reproducing circuit further comprises switching means connected in series to a biasing circuit.

5. A control system for a tape recorder as set forth in claim 1, and further comprising stopping and operating reference signal generating means to generate stopping and operating reference signals corresponding to said stopping and operating modes, respectively, an operational circuit having input means connected through said mode selecting switches to said stopping and operating reference signal generating means to receive said stopping and operating reference signals therefrom and connected also to said variable signal generating means to receive said variable signal therefrom, said operational circuit operating said stopping and operating reference signals and said variable signal so as to generate a control signal for said control electric motor, said operational circuit being constructed to generate said control signal to control said variable signal generating means so as to generate the variable signal corresponding to the reference signal of the selected mode when said variable signal does not correspond to said selected reference signal, and to generate no control signal when the variable signal corresponds to the selected reference signal, and means to apply only the stopping reference signal from said stopping and operating reference signal generating means to said input means of said operational circuit when a level of a voltage across a power source is less than a predetermined level.

6. A control system for a tape recorder as set forth in claim 5, wherein said means to apply only the stopping reference signal comprises a normally open contact of a relay connected in parallel to said stopping mode selecting switch and normally closed contacts of said relay connected to said operating mode selecting switches, and said relay being energized by an output of source voltage detecting means.

7. A control system for a tape recorder as set forth in claim 6, wherein said source voltage detecting means comprises a constant voltage generator, a voltage divider to divide a source voltage and a comparator to compare a divided voltage from said voltage divider and a constant voltage from said constant voltage generator, and said output of said source voltage detecting means being produced when the level of said divided voltage is lower than that of said constant voltage.

* * * * *

UNITED STATES PATENT AND TRADEMARK OFFICE
CERTIFICATE OF CORRECTION

PATENT NO. : 4,263,626
DATED : April 21, 1981
INVENTOR(S) : Kozo Kobayashi

It is certified that error appears in the above-identified patent and that said Letters Patent are hereby corrected as shown below:

Column 1, line 35, delete "in the condition" and insert --during the operation--.

Signed and Sealed this

Eleventh Day of August 1981

[SEAL]

*Attest:*

GERALD J. MOSSINGHOFF

*Attesting Officer*   Commissioner of Patents and Trademarks